United States Patent [19]

Berger

[11] Patent Number: 5,687,200
[45] Date of Patent: Nov. 11, 1997

[54] SYSTEM FOR SYNCHRONIZING DISTORTED DATA IN A DATA COMMUNICATION SYSTEM

[75] Inventor: Gerald M. Berger, Northbrook, Ill.

[73] Assignee: Maxtec International Corporation, Chicago, Ill.

[21] Appl. No.: 390,653

[22] Filed: Feb. 17, 1995

[51] Int. Cl.$^6$ .................................................. H04L 7/00
[52] U.S. Cl. ............................ 375/363; 375/354; 370/504
[58] Field of Search ................................. 375/242, 354, 375/357, 362, 363, 364, 365, 368; 370/504

[56] References Cited

U.S. PATENT DOCUMENTS 5,020,057  5/1991  Taniguchi et al. ..................... 375/363
5,329,557  7/1994  Suzuki et al. .......................... 375/363
5,539,785  7/1996  Burch et al. ........................... 375/363

*Primary Examiner*—Stephen Chin
*Assistant Examiner*—Don Vo
*Attorney, Agent, or Firm*—Laff, Whitesel, Conte & Saret, Ltd.

[57] ABSTRACT

A data transmission link is especially designed to meet new FCC regulations setting 5 KHz band widths for transmitting control signals to industrial systems. The new band width creates timing distortions which are overcome by inserting a new timing pulse into a data pulse stream. The center of that inserted timing pulse is taken as an axis of reference for retiming each pulse in the data pulse stream so that the fluctuations of a time frame synchronizing pulse become irrelevant. The retiming process is repeated for each data time frame.

14 Claims, 2 Drawing Sheets

SYSTEM FOR SYNCHRONIZING DISTORTED DATA IN A DATA COMMUNICATION SYSTEM

FIELD OF THE INVENTION

This invention relates to a data communication system and more particularly to systems for synchronizing data which has been distorted, as by interference, bandwidth restrictions, transmission and reception techniques, circuits used, or any other restraints, which results in poor timing and loss of data.

BACKGROUND OF THE INVENTION

Current data communication systems rely on a synchronizing ("synch") pulse to mark the beginning of a data frame and to provide proper timing for clocking all data that follows within that data frame. So that it can be easily identified, this synch pulse is usually unique, such as being longer in duration than any other binary word impulse appearing in the data frame. The timing function for other pulses in the data frame is conventionally referenced from one edge, such as the trailing edge, of this synch pulse. This use of the trailing edge often causes a problem which the invention addresses. The distortion of the trailing edge of the synch pulse may be caused by any of the above mentioned and other sources. The result of this distortion is the production of a timing error that causes an incorrect clocking of data.

Therefore when the data is received, it is usually passed through a signal processing circuit, which resynchronizes the signals with respect to the local clock in order to reestablish the correct logic level and symmetry of the data. This synchronized data is then read by the systems that follow which often have no way of further correcting the timing errors.

The specific field of the invention lies in the industrial frequency spectrum, although the means for and method of correcting timing distortion may be extended to any data transmission. For example, this industrial field includes remote controllers for large overhead travelling cranes, or the like. Heretofore, the government (FCC) standards have allowed a bandwidth of 20 KHz for transmission of data in the industrial spectrum, but the number of industrial users has increased and the spectrum has become so congested that there is little or no room for further expansion as new users appear. Therefore, the FCC has indicated that it will reduce the allowed bandwidth to 5 KHz. This reduction of band width causes severe distortion problems.

More particularly, the pulse width of the synch pulse is measured by a process involving high speed clock pulses which, in effect, turns a counter on and off. The counting of the clock pulses begins at a leading edge of a synch pulse and ends counting at the trailing edge of the pulse. Then, the counter indicates how many pulses occurred during the synch pulse period.

When the bandwidth is reduced to 5 KHz, these clock pulses become so short that they can not reliably detect the trailing edge because the normal deterioration conditions caused by a transmission of a pulse produces a trailing edge which trails off (as distinguished from the vertical drop of a square pulse). At one time, the overly narrow clock pulse might occur at the start of the trailing edge, and at another time it may appear at the end of the trailing edge, and at still other times the clock pulse may appear any place in the middle of the trailing edge. Hence, it is conceivable that the same trailing edge might be detected in response to any one of three successive clock pulses. If timing starts from such randomly occurring events, there is a serious time jitter in the data pulses. If an effort is made to correct either the transmission or the pulse width detection in order to overcome this jitter, the equipment becomes prohibitively expensive.

Moreover, even if the expense is accepted, it may be doubtful that a sufficiently high level of reliability can be achieved in the industrial field. For example, if there is a synch pulse timing distortion in telephony, there is only a garbled speech followed by a hang up and the placing of a new call. However, if an overhead crane carrying a very heavy load encounters such a synch pulse timing distortion, it is conceivable that the heavy load may slam into a building wall and cause great damage. Of course, this is only an example of how and why the industrial field presents its own set of problems.

SUMMARY OF THE INVENTION

An object of the invention is to provide a means for and method of reestablishing correctly synchronized timing after signal processing has taken place.

In keeping with an aspect of this invention, the synch pulse is detected responsive to its own unique characteristics; then, two bit spaces, one low followed by one high, are added to the data frame immediately after the synch pulse. The first bit, which is a low, is preparatory so that the second bit, which is a high, can be accurately measured for determining the time duration of a bit period. There is one more low bit following this high bit, but this low bit is always present in order to separate the timing pulse from the data bits which follows. The high bit represents a single data bit, the duration of which may be measured to determine the exact center of that bit, thereby providing an accurate reference for clocking in all data that follows, regardless of the original data distortion. This process of adding a bit is repeated for every frame of data.

BRIEF DESCRIPTION OF DRAWING

A preferred embodiment of the invention is shown in the attached drawings, in which.

DESCRIPTION OF THE INVENTION

Figure 1:
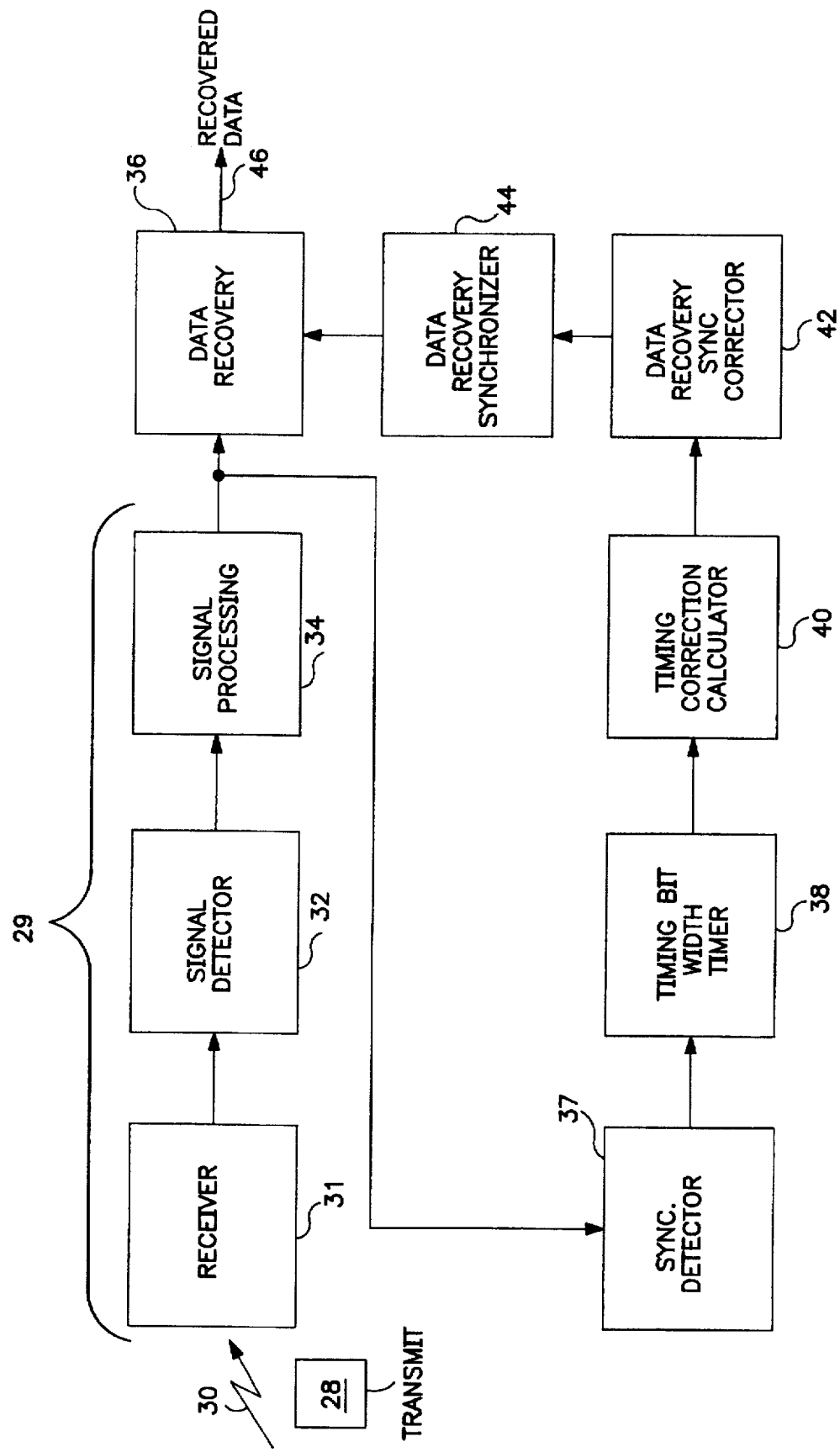
FIG. 1 is a block diagram showing the inventive system.

The inventive process may be implemented by various means involving hardware, firmware, or software and combinations thereof. The inventive techniques are described with respect to positive data; however, it should be understood that the invention also works with negative data.

The prior art data frame (FIG. 2A) starts with a wide synch pulse 20 followed by one low bit 22 which is then followed by the transmitted data 24. While the data may take any suitable form subject to the condition that no bit pattern will have a continuous high longer than the synch pulse, it usually includes an address code followed by seven binary words, each having 8 bits per word. The low bit described above is sometimes referred to as a delineator since its only purpose is to separate a timing bit from all other data.

The data frame which is thus formed may be transmitted at 28 (FIG. 1) to a receiver 29 via any suitable transmission line 30 such as radio, hardwire, fiber optics, FM, infrared, ultrasonic, or the like. At the receiver 29 (FIG. 1), the data is received at 31, detected at 32, and passed through a suitable signal processing circuit 34 where it is submitted to any suitable means for shaping pulses, such as by being amplified to a uniform amplitude, or the like, which is then clipped to form square pulses. The resulting signal is a train of pulse signals which is presented to both a data recovery means 36 (circuits, firmware, software, etc.) that will decode it, and to a synch pulse detector 37. Then the recovered data will be transmitted to any suitable means such as a microprocessor, computer or the like (not shown) which controls a device such as an overhead crane.

The width of the synch pulse 20 (FIG. 2B) is easily detected at 37, even if it is badly distorted, because the difference resulting from the distortion is minimal as compared to the difference caused by its width or extended time period as compared to the time period of the data pulses. The timer starts on the leading edge LE (FIG. 2B) and stops on the trailing edge TE of the synch pulse. Then, the decoding system waits for the next transition T1 following the synch pulse which is a voltage change from logic low to logic high, and which starts a timer 38 (FIG. 1) which may be any suitable known timing means, such as a clock pulse counter, for example.

The decoding system of the timing bit width timer 38 waits for the next transition T2, which is a voltage change from a logic high to a logic low, and which stops the timer. The time period of the pulse P1 next following the synch pulse 20 is now divided by two at timing correction calculator 40. Further, the timing correction calculator 40 adjusts for the time required for the calculation process. This measured pulse is a timing pulse P1, having a pulse period which is equal in duration to one data pulse. The pulse center PC is used as a base time reference for retiming the data originally received at 31.

This pulse center PC is sent to a data recovery synch corrector circuit 42, the output of which is used by a data recovery synchronizer 44. To correct synch timing, the data recovery synchronizer 44 sends properly timed clock signals to the data recovery system 36 in order to recover the data. As can be seen, the pulse center PC, and not the synchronizing pulse, is used for timing. Although the invention adds a pulse to the received data, there is no problem because the equipment receiving the recovered data, transmitted at 46, has adequate capacity to receive and accommodate the extra pulse.

Figure 2A:
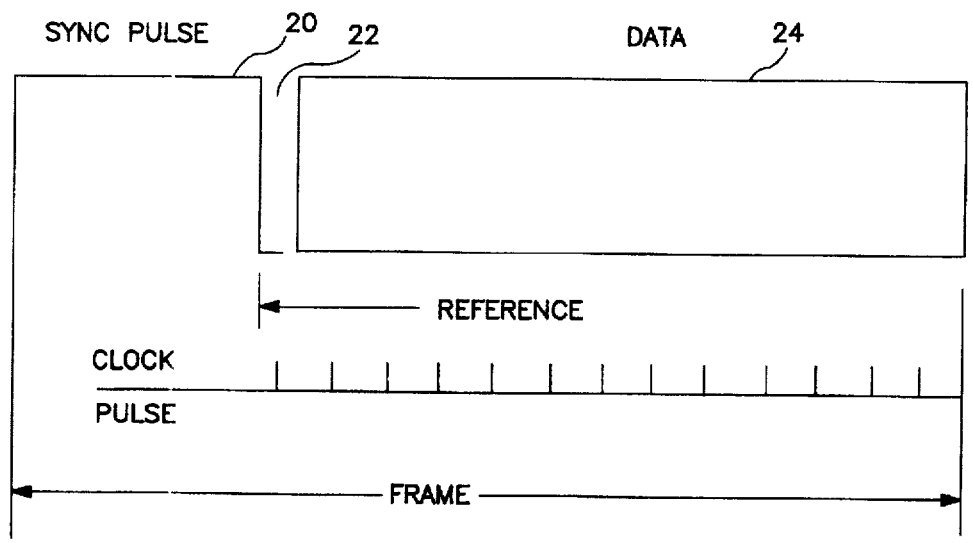
FIG. 2A is a timing chart which shows how data is transmitted in one standard prior art format.

FIG. 2A, is a chart which shows the timing which is used to transmit data at 28 (FIG. 1). The transmitted data is the same as that used in a conventional prior art system where the timing is referenced relative to an occurrence of the synchronizing pulse 20. The first data clock pulse occurs after the sync pulse with a separation by the following time period.

Pf=((1/BR)/2)−CT

Where:

Pf is the first time period after the synchronizing pulse

BR is the baud rate

CT is the calculation processing time

All of the remaining data in the data frame is clocked in, from the reference pulse 22, with the standard time period for that baud rate or (1/BR). Note that, in this prior art encoding, the timing is a fixed function which is referenced from the synchronizing pulse. There is no compensation for any delays in the synchronizing pulse which may be caused by distortion, interference, or other causes.

Figure 2B:
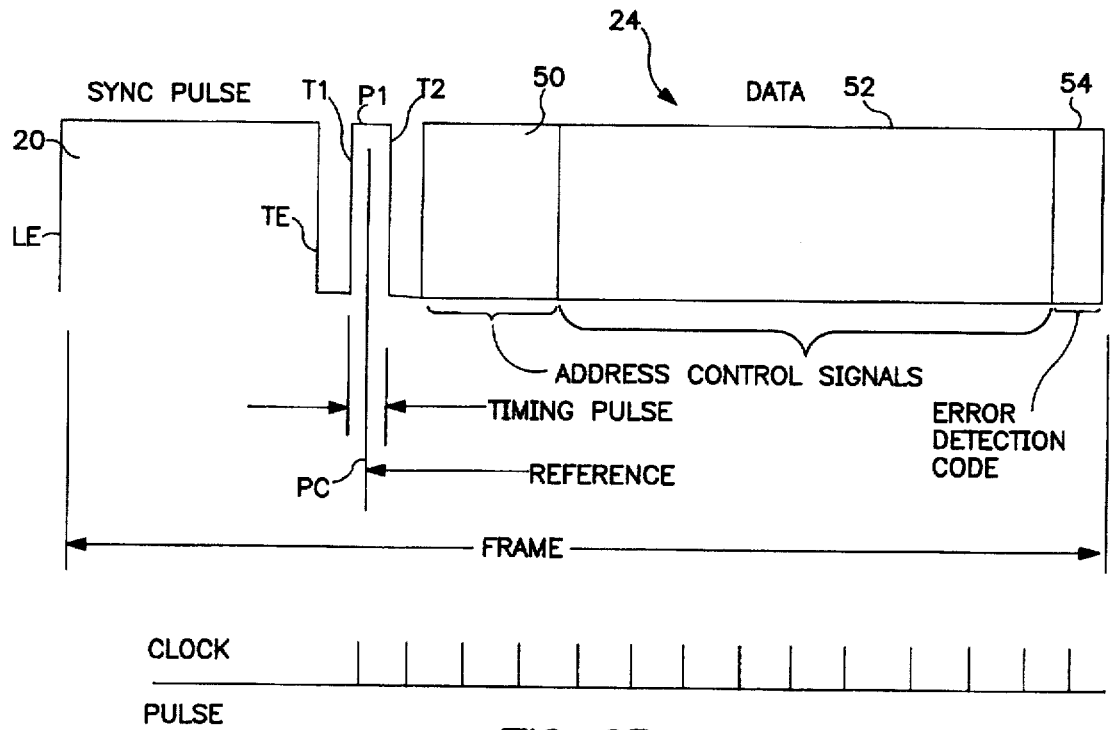
FIG. 2B shows how the invention inserts a timing bit which resynchronizes the data after the receipt thereof.

FIG. 2B shows the format of each data frame in the digital pulse stream of the recovered data which appears after the inventive data processing. The start of the data frame is marked by a synchronizing pulse 20. Next, there is the timing pulse which the inventive circuit inserts into the time frame in order to establish the timing reference point PC. Then, there is an address code 50 which identifies the destination of the digital data to equipment which receives the recovered data sent out from circuit 36.

The address code is followed by the control code, here the preferred data is seven binary words, each having eight bits. These control signals may be any that are useful downstream. For example, with an overhead travelling crane, the control signals may command such things as start/stop, raise or lower load, travel forward or backward, or move the load to the left or right.

The final pulse 54 in the format is any conventional type of an error detection code.

FIG. 2B also shows that an addition of a timing pulse P1 produced by the system of FIG. 1 is inserted into the time frame and at a position after the synchronizing pulse 20. In this inventive system, the synchronization of the data pulse stream in data recovery circuit 36 is not a fixed function which is referenced to the synchronizing pulse, but is a variable function determined by the width of the timing pulse P1 and more particularly is referenced to the pulse center PC of pulse P1. The width of the timing pulse P1 is the same as the width of any data pulse in the time frame. Therefore, all pulses are equally effected, if at all, by any distortion, interference and etc.

The time period for the data pulses occurring after the timing pulse P1 is described by the following function:

Pf=(1/BR)−((T2−T1)/2)−(CT)

Where:

T1 is the start of the timing pulse

T2 is the end of the timing pulse

CT is a calculation processing time

All of the remaining data in the time frame is also clocked in, from the center PC of this reference pulse P1, with the standard time period for that baud rate or (1/BR).

Those who are skilled in the art will readily perceive how to modify the invention. Therefore, the appended claims are to be construed to cover all equivalent structures which fall within the true scope and spirit of the invention.

The claimed invention is:

1. A method of retiming a data pulse stream after a possible time distortion caused by a transmission line during a transmission of said data pulse stream, said method comprising the step of:

detecting a synchronizing pulse in said data pulse stream, starting a timer responsive to a pulse transition edge following said detected synchronizing pulse, generating and inserting a new timing pulse into said data pulse stream at a location following said synchronizing pulse response to said timer, dividing said new timing pulse by two in order to identify a calculated time at the center thereof, and retiming said data pulse stream following said insertion of said new timing pulse relative to said calculated time identified at the center of said new timing pulse.

2. The method of claim 1 wherein said retimed data pulse stream is a pulse stream in a data frame including the detected synchronizing pulse.

3. The method of claim 1 wherein said data pulse stream is divided into successive data frames, and said synchronizing pulse is a wide pulse marking the start of each time frame, said data frame including a pulse stream following said new timing pulse, said pulse stream including control signals used in an industrial system.

4. The method of claim 3 wherein said industrial system has a transmission line frequency band width limited to no more than 5 KHz.

5. The method of claim 1 wherein a first data pulse in said transmitted data pulse stream occurs after a time period following said synchronizing pulse, said first data pulse being described as $Pf=((1/BR)/2)-CT$ Where:

Pf is the first time period after the synchronizing pulse
BR is the baud rate
CT is the calculation processing time and wherein the first data pulse in said retimed data pulse stream occurs after a time period following said synchronizing pulse described as $Pf=(1/BR)-((T2-T1)/2)-(CT)$ Where:

T1 is at the leading edge of said timing pulse
T2 is at the trailing edge of said timing pulse.

6. A data link for use in an industrial system, said data link comprising means for transmitting control signals in a form of a data pulse stream divided into cyclically recurring time data frames, each of said time data frames being identified by a synchronizing pulse followed by at least a data pulse train, means at a remote location for receiving said synchronizing pulse and said data pulse stream, means responsive to said received data pulse stream for detecting successive ones of said synchronizing pulse, means responsive to each detected synchronizing pulse for inserting a new timing pulse into said data pulse stream, said new timing pulse being inserted at a location between said synchronizing pulse and said data pulse train, means for calculating a center time of each newly inserted timing pulse, and means for measuring and retiming an occurrence of each pulse in said data pulse train relative to said calculated center time.

7. The data link of claim 6 wherein said data transmitting means comprises a hand-held transmitter coupled to a remote location via a transmission line taken from a group consisting of a radio link, an infrared link, an ultrasonic link, hard wiring, or fiber optics.

8. The data link of claim 7 wherein said synchronizing pulse is wider than a data pulse, said means for detecting said synchronizing pulse comprises means for detecting said wide pulse, a trailing edge of said wide pulse having a possible timing distortion caused by said transmission line, whereby said insertion of said new timing pulse into said data pulse stream may reflect said timing distortion, and said means for calculating said center time of said new timing pulse establishes a new axis of time reference independent of said timing distortion.

9. A digital control system for use in an industrial radio frequency spectrum, said system comprising:

a transmitter for transmitting a digital pulse stream over a transmission line to a remote receiver, said transmission line being taken from a group consisting of a radio link, and infrared link, an ultrasonic link, hard wiring, and fiber optics, said remote receiver comprising a receiver, a signal detector, and a pulse shaping signal processing circuit, a data recovery circuit, a synchronizing pulse detector, means responsive to said pulse shaping signal processing circuit for transmitting said digital pulse stream to said data recovery circuit and said synchronizing pulse detector, means responsive to said synchronizing pulse detector for generating a timing pulse having a pulse center, means for inserting said timing pulse into said digital pulse stream while in said data recovery circuit, means in said data recovery circuit for recovering data from said digital pulse stream by retiming pulses in said digital pulse stream relative to said pulse center of said timing pulse, and means for transmitting said recovered data from said data recovery circuit to control downstream equipment.

10. The system of claim 9 wherein said transmitter transmits said digital pulse stream divided into a number of time data frames, each of said time frames beginning with a synchronizing pulse, and said means for inserting said timing pulse inserts timing pulse into said digital pulse stream immediately following each of said synchronizing pulses in responses to said synchronizing pulse detector.

11. The system of claim 10 and means following said synchronizing pulse in each data frame of said digital pulse stream for identifying an address of the digital pulse stream to equipment receiving said recovered data.

12. The system of claim 11 wherein each frame of said digital pulse stream comprises control signals following said address identification.

13. The system of claim 12 and a parity pulse in a final pulse position in each frame of said digital pulse stream.

14. The system of claim 13 wherein a first data pulse in said digital pulse stream as transmitted occurs after a time period following said synchronizing pulse, said first transmitted data pulse being described as $Pf=((1/BR)/2-Ct$ Where:

Pf is the first time period after the synchronizing pulse
BR is the baud rate
CT is the calculation processing time and wherein the first data pulse in said recovered digital pulse stream occurs after a time period following said synchronizing pulse described as $Pf=(1-BR)-((T2-T1)/2)-(Ct)$ Where:

T1 is at the leading edge of said timing pulse
T2 is at the trailing edge of said timing pulse.

* * * * *